UNITED STATES PATENT OFFICE.

HERVEY DEXTER THATCHER, OF POTSDAM, NEW YORK.

BAKING-POWDER.

1,286,145.

Specification of Letters Patent. Patented Nov. 26, 1918.

No Drawing. Application filed October 12, 1916. Serial No. 125,198.

*To all whom it may concern:*

Be it known that I, HERVEY D. THATCHER, a citizen of the United States, residing at Potsdam, in the county of St. Lawrence, State of New York, have invented certain new and useful Improvements in Baking-Powders, of which the following is a description, reference being had to the accompanying drawing and to the figures of reference marked thereon.

My invention relates to an improved baking powder based upon the patent heretofore issued to me, under date of March 4th, 1890, No. 422,464.

The baking powder covered in the aforesaid patent consisted of cream of tartar, an alkali metal bicarbonate and sugar of milk, or its equivalent, according to certain proportions approximately set out therein.

The present invention consists in strengthening and improving said patented baking powder by adding thereto from four to ten parts more or less of very finely powdered casein made from centrifugated milk, prepared so as to preserve it in its natural slightly acid state. Properly prepared and finely powdered casein is exceedingly hygroscopic and in connection with milk sugar makes a most excellent keeper. It is slightly acid provided care is exercised in its manufacture, and, therefore, aids the cream of tartar in liberating from the bicarbonate of sodium the carbon dioxid or leavening gas. Furthermore, it stiffens the walls surrounding the cells created by the leavening gas, so that foods in which the baking powder is used are less likely to fall or give way while in the oven, or soon after being withdrawn. Furthermore, casein is itself a most excellent food. In preparing this casein, it should be free from every trace of butter fat to insure its keeping quality.

I have found a good working formula for my improved baking powder to consist substantially of the following:

Powdered cream of tartar sixty-seven parts;

Bicarbonate of sodium thirty to thirty-two parts;

Powdered milk sugar four parts;

Finely powdered casein from four to ten parts.

It will be understood that the proportions above given need not be strictly adhered to, but are approximate, and may be varied, although the best results I find are obtained by following them.

Having thus described my invention, what I claim as new and desire to secure by Letters Patent, is:

A baking powder consisting of approximately sixty-seven parts of cream of tartar, thirty parts of bicarbonate of sodium, four parts powdered milk sugar and from four to ten parts of finely powdered casein.

In testimony whereof I affix my signature in the presence of two witnesses.

HERVEY DEXTER THATCHER.

Witnesses:
FREDERICK P. BARNHART,
WILLIAM S. REMINGTON.